Jan. 19, 1960    A. W. SCHWEITZER    2,921,489
CHAIN-TYPE PIPE WRENCH
Filed March 18, 1957    2 Sheets-Sheet 1

INVENTOR.
Arthur W. Schweitzer
BY Michael Dufrin
ATTORNEY

Jan. 19, 1960     A. W. SCHWEITZER     2,921,489
CHAIN-TYPE PIPE WRENCH
Filed March 18, 1957     2 Sheets-Sheet 2
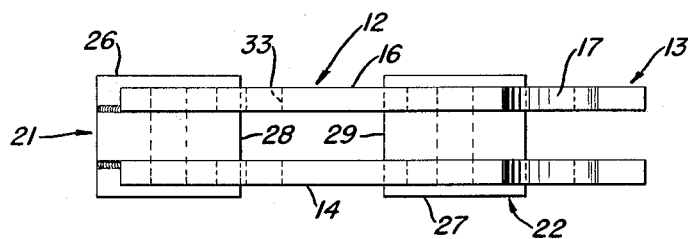
Fig. 3
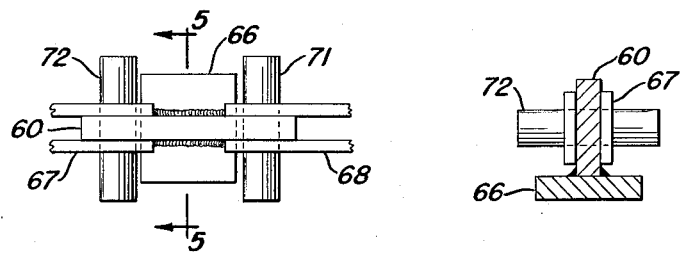 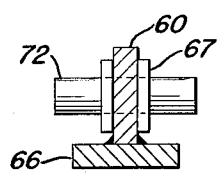
Fig. 4     Fig. 5
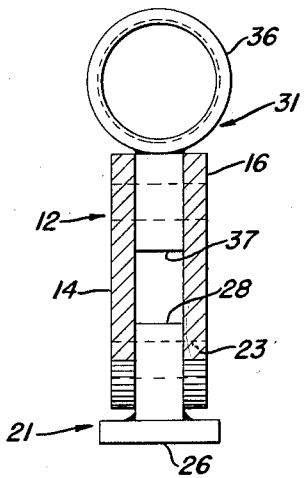
Fig. 2
INVENTOR.
Arthur W. Schweitzer
BY
ATTORNEY

United States Patent Office 2,921,489
Patented Jan. 19, 1960

2,921,489

CHAIN-TYPE PIPE WRENCH

Arthur W. Schweitzer, Schererville, Ind., assignor to Standard Oil Company, Chicago, Ill., a corporation of Indiana Application March 18, 1957, Serial No. 646,603

2 Claims. (Cl. 81—69)

This invention relates to chain-type pipe wrenches.

Chain-type pipe wrenches are extremely useful in the pipe fitters tool box because they are adaptable to many sizes of pipes, and are very commonly used. The conventional chain-type pipe wrench depends on teeth on the jaw biting into the pipe surface for its gripping power. In order to obtain the necessary gripping power the jaw must fit solidly into the pipe surface and marring of the surface results; in the case of thin walled pipes serious weakening of the pipe may take place. As all of the pipe gripping action is concentrated in the jaw there is a tendency to deform the pipe particularly when the pipe is being turned near one end. This deformation frequently causes serious difficulty in attaining tight fitting joints.

The chain-type pipe wrench of this invention overcomes these disabilities by distributing the gripping or clamping action more or less uniformly over the periphery of the outer pipe surface by means of foot-plates joined to links of the chain at spaced intervals and replacing the conventional jaw member with foot-plate members affixed to a clamping-engaging device.

A specific embodiment of the invention is shown in figures which form a part of this disclosure.

Figure 2 shows a partial sectional view of the clamping-engaging device on the plane 2—2 of Figure 1.

Figure 3 shows a top view of the clamping-engaging device.

Figure 4 shows a top view of a link provided with a foot-plate and adjoining links.

Figure 5 shows a partial cross-sectional view along the plane 5—5 of Figure 4.

Figure 1:
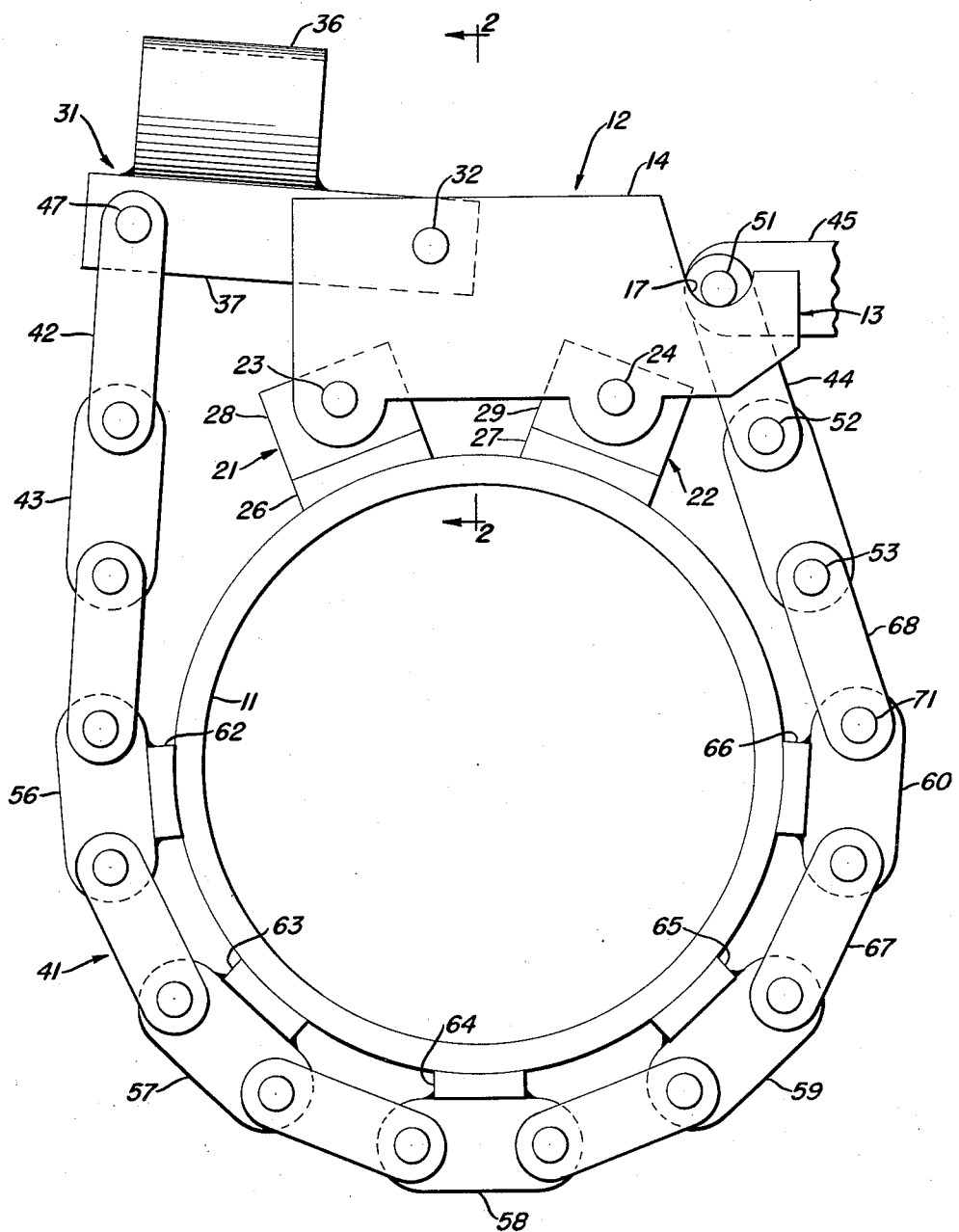
Figure 1 shows an embodiment of the chain-type pipe wrench of the invention in position around a pipe.

In Figure 1 the chain-type pipe wrench is shown positioned in place around pipe 11. The chain-type pipe wrench of the invention comprises a clamping-engaging device 12. The clamping-engaging device 12 is provided with a jaw-like engaging element 13. Clamping-engaging device 12 may be made of two parallel plates 14 and 16 as shown in Figure 3 or it may be made of a single plate of the proper thickness for the particular use intended. Jaw-like member 13 shown here may be provided with a simple arcuate depression 17 or may be provided with other means for rapidly engaging and holding firmly links of a chain.

Clamping-engaging device 12 provides a mounting point for one or more friction members. In this embodiment friction members 21 and 22 are shown mounted on the pipe side of clamping-engaging device 12. In order to provide flexibility by permitting maximum effectiveness with various pipe sizes friction members 21 and 22 are pivotally mounted on clamping-engaging device 12. In this embodiment friction members 21 and 22 are pivotally mounted on clamping-engaging device 12 by means of pins 23 and 24. Friction members 21 and 22 are each provided with the foot-plate friction elements 26 and 27, respectively. The foot-plate friction elements 26 and 27 are adapted to more or less uniformly contact the outer surface of pipe 11. When the chain-type pipe wrench of the invention is to be used over a large number of pipe sizes it is obvious that the foot-plate friction elements will be given a compromise shape such that a maximum amount of surface contact, consistent with various pipe sizes, will be obtained by the pipe surface and the foot-plate friction elements.

In this embodiment the friction members 21 and 22 are T-shaped objects, with the pivotable mounting being obtained by pins 23 and 24, respectively, passing through holes in the legs 28 and 29, respectively, of the T of each member. The friction members 21 etc. need not be T-shaped; for example when clamping-engaging device 12 is made of a single plate the friction member 21 may be provided with two legs 28 which straddle the plate forming device 12.

A lever-member 31 is pivotably mounted on clamping-engaging device 12 by means of pin 32 positioned in opening 33 provided in device 12. In this embodiment lever-member 31 is provided with a piece of pipe 36 welded to bar 37. Pipe 36 provides a point for insertion of a lever arm of suitable length for application of force on said lever-member to clamp the wrench about the pipe 11.

A chain-member 41 comprising link-members 42, 43, 45 etc., is an integral part of the wrench. Chain-member 41 may be any one of the conventional types of chains used in pipe wrenches, for example, roller-link chain or single element and double element links such as used herein. Chain-member 41 is mounted to bar 37 of lever-member 31 at the end of link-member 42 by means of pin 47. In this embodiment link member 42 is pivotally mounted to lever member 31. In some instances this link may be fixed to member 31 with the pivoting obtained through link-member 43. Chain-member 41 encircles pipe 11 and provides a loose fit of such wrench about pipe 11 by engaging jaw-member 13 at arcuate point 17. In order to obtain this engagement chain-member 41 is provided with a number of lug-members 51, 52 and 53 shown. In this instant lug-members 51 etc. are simply over-long pins used to join the links of the chain near the engaging end, which is opposite the end joined to lever-member 31. It is apparent that many methods of engaging the links of the chain in the clamping-engaging device 12 may be devised and it is intended that these come within the scope of the invention.

Chain-member 41 contains a number of link elements which are provided with link-foot-plate friction elements. In this embodiment links 56, 57, 58, 59 and 60 are provided with friction elements 62, 63, 64, 65 and 66, respectively. In this embodiment five link-foot-plate friction elements are used. However, the number of link-foot-plate elements used in any particular chain-member is dependent upon the size of the pipe and even the type of the pipe to be operated on. In the case of a small pipe the chain-type wrench may be provided with only one friction member on the clamping-engaging device and only two link-foot-plate friction elements. In general, when operating with larger size pipe, for instance 4″ O.D., the chain-type pipe wrench should contain two friction members mounted on the clamping-engaging device and at least three friction elements positioned on the chain-member.

In Figures 4 and 5 the chain-member is illustrated at link 60. Here link 60 is formed of a single bar and is joined to links 67 and 68, respectively, which are formed of two bars. Link 60 is provided with link-foot-plate friction element 66 which is directly welded to the link 60. In this embodiment the pins used throughout the chain-member are of about the same length and can engage jaw-member 13 in the same manner as pin 51 shown in Figure 1. Herein link 60 is joined to link 68 by pin 71 and to link 67 by pin 72. Friction element 66 and the other friction elements mounted on chain-member 41 are adapted to substantially conform to the outer surface of pipe 11.

The contact surface of friction elements 26, 27, 62 through 66, respectively, may be smooth or roughened to increase the amount of friction or may even be provided with teeth for use on very large pipe. When it is desired to operate on smooth surface pipe without marring a greater number of friction elements may be used in order to provide the friction needed to hold the wrench about the pipe without marring the surface of the pipe. When using a wrench on a pipe of large diameter and hard surface the friction elements may be provided with teeth and the number of friction elements reduced. Also the contact surface of the friction elements may be modified for particular installations. When handling rough walled pipe, the contact surface of each friction element may be reduced in amount, as against a pipe for use on smooth surface pipes wherein a large contact surface may be needed to avoid marring of the surface of the pipe and providing the necessary amount of friction.

In the operation of the pipe wrench the clamping-engaging device 12 is placed so that friction elements 26 and 27 are in contact with the outer surface of the pipe. The chain-member 41 is coupled around the pipe and pin end 51 is inserted in jaw-member 13 to provide a loose fit of the wrench about the pipe. A lever arm, not shown, is inserted in pipe 36 and force is applied on the lever in a manner such that the chain-member is drawn tightly about the pipe bringing on friction elements into solid contact with the pipe surface. Further application of force on the lever will result in rotation of the pipe; or will hold the pipe stationary while a coupling or joint is being rotated at one end of the pipe.

A working embodiment of the pipe wrench of the invention can be made from the figures which are drawn to a scale of ¾" equal 1".

Thus, having described the invention, what is claimed is:

1. A chain-type pipe wrench comprising a clamping-engaging device provided with a jaw-like engaging element, friction members pivotably mounted on said device, each of said friction members being provided with a foot-plate friction element adapted to contact more or less uniformly the outer surface of a pipe and provided with smooth contact surfaces, a lever-member pivotally mounted on said device, a chain-member, comprising link-members, joined at one end to said lever-member, said chain-member being provided with lug-members positioned near the end of said chain-member opposite the end joined to said lever-member, said lug-members being adapted to engage said jaw-like engaging element to provide a loose fit of said wrench about a pipe, a number of link-foot-plate friction elements joined to said link-members in said chain-member at spaced intervals, said link-foot-plate friction elements being adapted to substantially conform to the outer surface of a pipe and provided with smooth contact surfaces, and said lever-member and said clamping engaging device being adapted to clamp said wrench by way of said friction elements about a pipe by application of force on said lever-member.

2. The wrench of claim 1 wherein said lever-member is T-shaped, said member being pivotally mounted on said device through a leg of the T.

References Cited in the file of this patent
UNITED STATES PATENTS

| | | |
|---|---|---|
| 810,738 | Fesler | Jan. 23, 1906 |
| 1,005,747 | Peterson et al. | Oct. 10, 1911 |
| 1,145,560 | Corder | July 6, 1915 |
| 1,576,414 | Cuppett | Mar. 9, 1926 |